(Model.)
W. E. DODGE.
INJECTOR.
No. 478,317. Patented July 5, 1892.
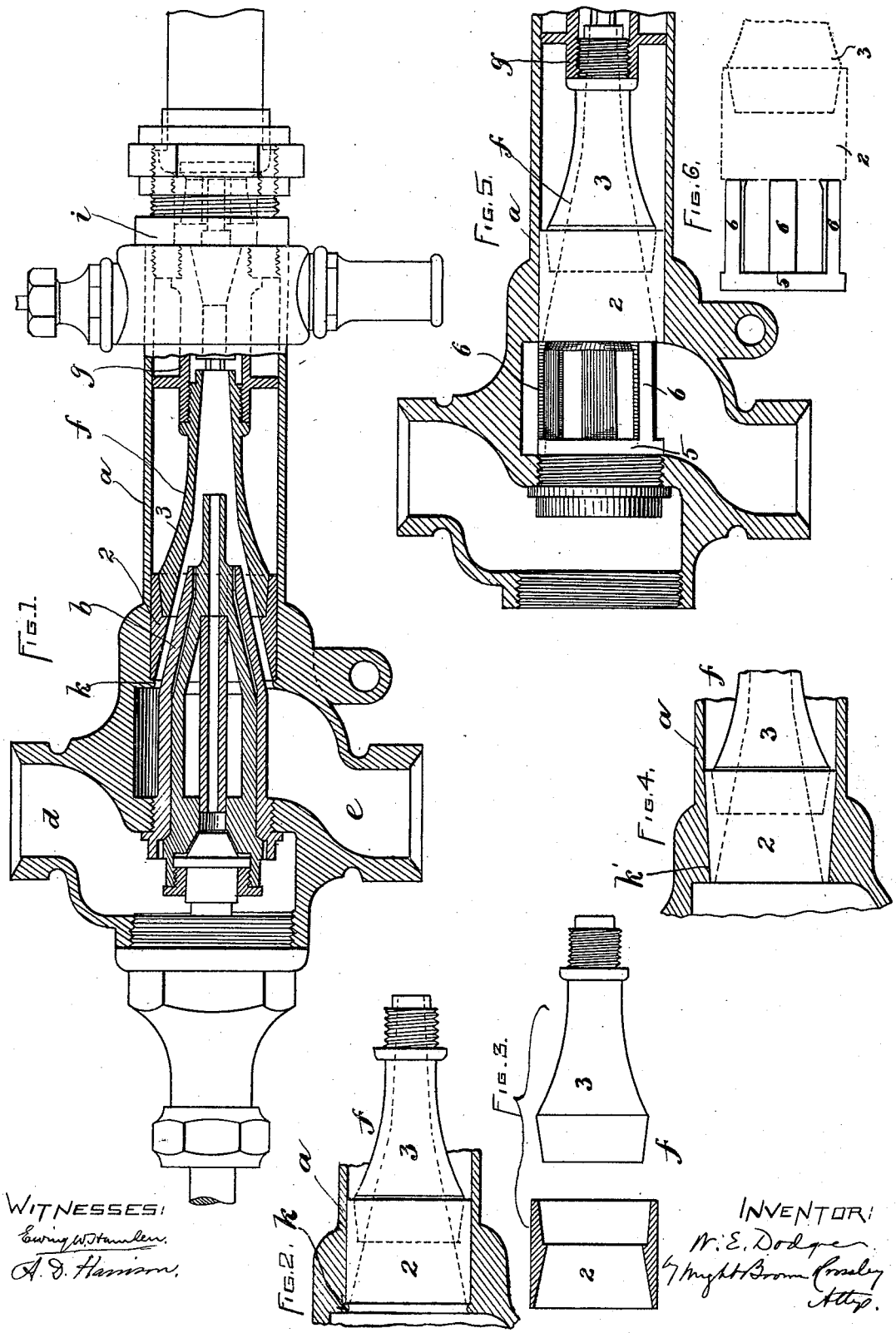
WITNESSES:
Ewing W. Stanley
A. D. Harrison
INVENTOR:
W. E. Dodge
by Wight Brown Crosley
Attys.

UNITED STATES PATENT OFFICE.

WALTER E. DODGE, OF EVERETT, ASSIGNOR TO THE NATIONAL TUBE WORKS COMPANY, OF BOSTON, MASSACHUSETTS.

INJECTOR.

SPECIFICATION forming part of Letters Patent No. 478,317, dated July 5, 1892.

Application filed March 9, 1891. Serial No. 384,214. (Model.)

*To all whom it may concern:*

Be it known that I, WALTER E. DODGE, of Everett, in the county of Middlesex and State of Massachusetts, have invented certain new and useful Improvements in Injectors, of which the following is a specification.

This invention is an improvement on the construction shown and claimed in Letters Patent of the United States No. 383,109, dated May 22, 1888. In said patent the principal feature of novelty was a combining-cone made in two separable sections, one of which was positively connected with the casing of the injector, while the other was connected with a removable nut or connecting end detachably secured to the casing, so that the last-named section could be removed independently of the other section, the object of the invention being to permit the renewal of that portion of the combining-cone which is subject to the greatest wear without involving the expense of throwing away the entire combining-cone, the other section—viz., the one attached to the casing—being adapted to serve much longer than the removable section. In said patent the construction of the combining-cone is such that the inner section, or that one which is attached to the casing, could only be inserted and removed at the receiving end of the casing, or, in other words, at that end where the steam and water inlets are located, so that in inserting and removing the entire combining-cone both ends of the casing have to be opened.

My present invention has for its object to provide a sectional combining-cone which may be inserted and removed as a whole at the delivering end of the casing, so that when it is necessary to insert or remove any part of the cone or the whole only one end of the casing will require to be opened, the portion of the combining-cone subject to the greatest wear being independently removable, as in the patent above referred to.

To this end the invention consists in the improvements which I will now proceed to describe.

In the accompanying drawings, forming a part of this specification, Figure 1 represents a longitudinal section of an injector provided with my improvements. Fig. 2 represents a longitudinal section of a portion of the injector, showing a modification. Fig. 3 represents the two parts or sections of the combining-cone removed from the casing, one of said parts being shown in section and the other in elevation. Figs. 4, 5, and 6 represent other modifications hereinafter referred to.

The same letters and numerals of reference indicate the same parts in all the figures.

In the drawings, $a$ represents the casing of the injector, having the steam-cone $b$, steam-inlet $d$, water-inlet $e$, the combining-cone $f$, and the delivery-cone $g$, said parts being, except in the particulars hereinafter specified, of the same construction as that shown in Letters Patent No. 383,109 above referred to, the combining-cone being made in two sections 2 3, as in said patent, the section 2 including the larger and inner end of the combining-cone and bearing on the casing $a$, while the section 3 is externally screw-threaded at its outer end for engagement with the delivery-tube $g$, the latter being secured to a nut or connecting end $i$, detachably secured to the delivering end of the casing, all as shown in the patent above referred to.

In carrying out my invention I make the section 2 of the combining-cone of such diameter that it can be freely inserted and removed at the delivering end of the casing when the nut $i$ is removed therefrom and provide within the casing a stop, which limits the movement of the section 2 toward the receiving end of the casing and permits said section to move from the delivering end to its operative position and supports said section in said position. The said stop is shown in Figs. 1 and 2 as an inwardly-projecting lip or flange $k$, formed integral with the casing and arranged to bear on one end of the section 2. In Fig. 4 I show the said stop as a beveled or tapered seat $k'$, formed on the internal surface of the casing, the section 2 being correspondingly beveled or tapered, so that its movement toward the receiving end of the casing will be arrested by said seat.

In Fig. 5 I show the stop as a spider made in a separate piece from the casing and comprising a ring 5, adapted to bear against a shoulder on the steam-cone, and a series of arms 6, projecting from said ring toward the delivering end of the casing, the outer ends of said arms being arranged to bear on one end of the section 2, as shown more clearly in Fig. 6.

It will be seen that in each of the constructions above described the combining-cone as a whole can be inserted in and removed from the delivering end of the casing and has its operative position defined by a stop within the casing, while the sectional construction of said cone enables the part 3, which is subject to the greatest wear and is most liable to become inoperative, to be readily removed without disturbing the section 2, that bears on the casing.

I prefer to form the meeting ends of the sections 2 3 as shown in the several figures of the drawings, the section 2 having an internal tapered recess at one end, while the corresponding end of the section 3 is externally tapered to fit said recess.

I claim—

In an injector, the combination of the casing, the combining-cone, and a seat or stop in said casing adapted to prevent the movement of the combining-cone toward the steam and water receiving end of the casing, said seat offering no resistance to the movement of said cone in the opposite direction, the said combining-cone being made in separable sections 2 3, the inner one 2 of which is formed to bear on the said seat in the casing, while the other 3 is adapted to be detachably connected to the delivery cone or tube, said section 2 being of such diameter that it may be introduced into the outer or delivering end of the casing and moved toward the receiving end until it is arrested by said stop, whereby all parts of the combining-cone may be inserted and removed at the delivering end of the casing, the outer portion of the said cone being adapted by the sectional construction of the cone to be removed independently of the seated inner portion, as set forth.

In testimony whereof I have signed my name to this specification, in the presence of two subscribing witnesses, this 5th day of March, A. D. 1891.

WALTER E. DODGE.

Witnesses:
C. F. BROWN,
EWING W. HAMLEN.